United States Patent
Soininen et al.

(10) Patent No.: US 7,369,522 B1
(45) Date of Patent: May 6, 2008

(54) ACCESS CONTEXT MANAGEMENT FOR MACRO-LEVEL MOBILITY MANAGEMENT REGISTRATION IN AN ACCESS NETWORK

(75) Inventors: Jonne Soininen, Mountain View, CA (US); Jaakko Rajaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 993 days.

(21) Appl. No.: 10/030,538

(22) PCT Filed: Jul. 11, 2000

(86) PCT No.: PCT/FI00/00640

§ 371 (c)(1),
(2), (4) Date: Jan. 11, 2002

(87) PCT Pub. No.: WO01/05171

PCT Pub. Date: Jan. 18, 2001

(30) Foreign Application Priority Data

Jul. 12, 1999 (FI) .................................... 991597

(51) Int. Cl.
*H04Q 7/00* (2006.01)
(52) U.S. Cl. ..................... 370/328; 370/401
(58) Field of Classification Search ............... 370/328, 370/331, 340, 400, 401, 403; 455/435, 436
See application file for complete search history.

(56) References Cited

U.S. PATENT DOCUMENTS

| 5,793,762 | A | 8/1998 | Penners et al. |
| 6,104,929 | A * | 8/2000 | Josse et al. .................. 455/445 |
| 6,463,055 | B1 * | 10/2002 | Lupien et al. ............... 370/353 |
| 6,469,998 | B1 * | 10/2002 | Burgaleta Salinas et al. .... 370/338 |
| 6,661,782 | B1 * | 12/2003 | Mustajarvi et al. ......... 370/331 |

FOREIGN PATENT DOCUMENTS

| WO | WO 98/32304 | 7/1998 |
| WO | WO 98/43446 | 10/1998 |
| WO | WO 98/59468 | 12/1998 |
| WO | WO 00/14981 | 3/2000 |
| WO | WO 00/24209 | 4/2000 |
| WO | WO 00/54523 | 9/2000 |

OTHER PUBLICATIONS

C. Perkins, Editor, "IP Mobility Support", RFC 2002, Standards Track, Internet Engineering Task Force (IETF), pp. 1-79, (Oct. 1996).

* cited by examiner

*Primary Examiner*—Wing Chan
*Assistant Examiner*—Duc Duong
(74) *Attorney, Agent, or Firm*—Pillsbury Winthrop Shaw Pittman LLP

(57) ABSTRACT

In an access network which supports a mobile IP protocol, a packet data protocol context is opened at support node and a gateway node in order to establish a connection between a mobile node and a mobile IP foreign agent located at the gateway node. A mobile IP registration over the connection is initiated. The gateway node monitors whether the registration is successful or fails. The PDP context is deleted, if the registration irrecoverably fails. If the registration was unsuccessful but a retry could be successful, the PDP context may not deleted, but the registration is retried.

18 Claims, 3 Drawing Sheets

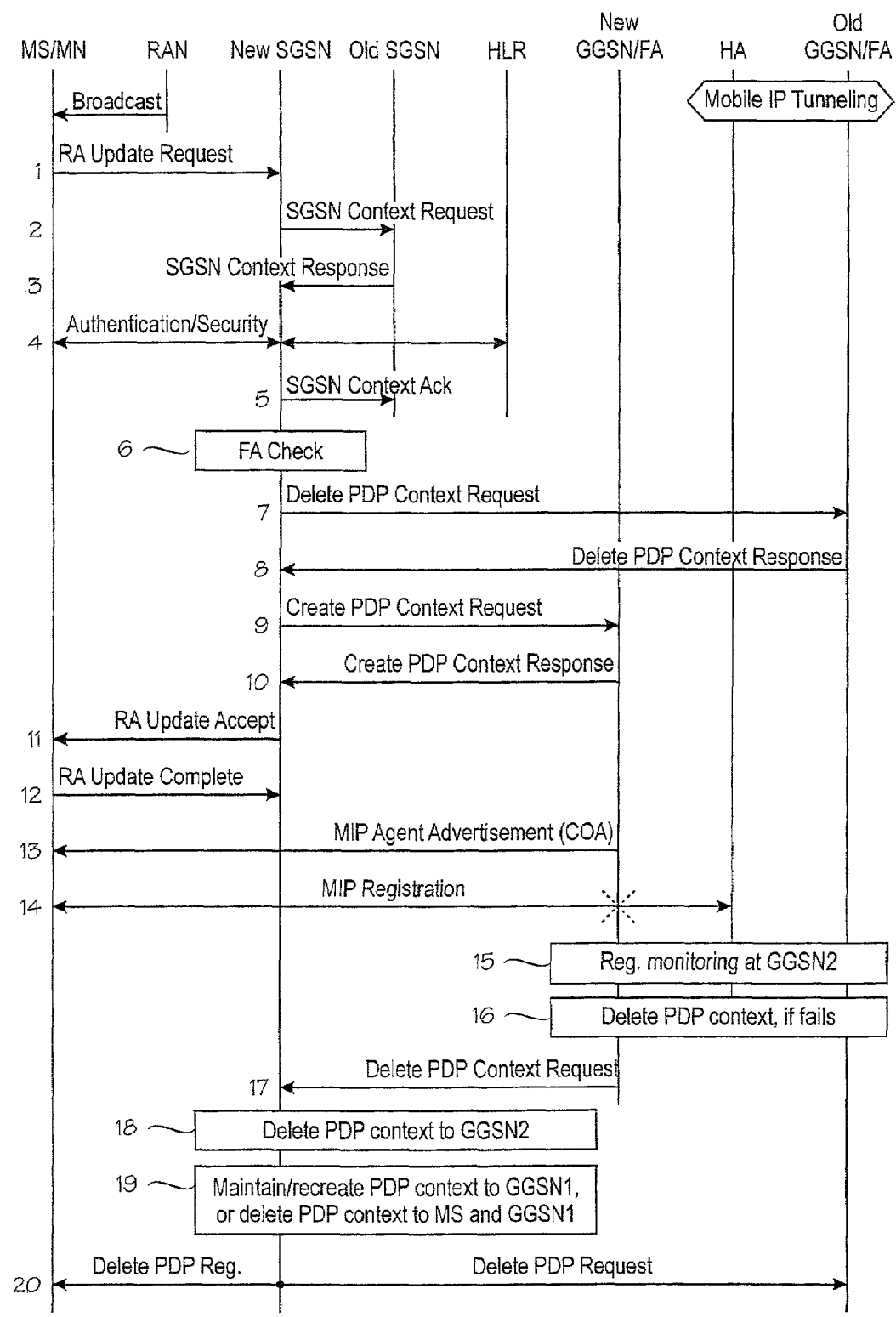

ACCESS CONTEXT MANAGEMENT FOR MACRO-LEVEL MOBILITY MANAGEMENT REGISTRATION IN AN ACCESS NETWORK

This is the U.S. National Stage of PCT/FI00/00640, which was filed on Jul. 11, 2000 in the English language.

FIELD OF THE INVENTION

The invention relates to the management of access context in an access network, in connection with a macro-level mobility management registration, such as a Mobile IP registration.

BACKGROUND OF THE INVENTION

A mobile communications system refers generally to any telecommunications system which enables wireless communication when users are moving within the service area of the system. A typical mobile communications system is a Public Land Mobile Network (PLMN). Often the mobile communications network is an access network providing a user with wireless access to external networks, hosts, or services offered by specific service providers.

The general packet radio service GPRS is a new service in the GSM system (Global System for Mobile communication). A sub network comprises a number of packet data service nodes SN, which in this application will be referred to as serving GPRS support nodes SGSN. Each SGSN is connected to the GSM mobile communication network (typically to a base station controller BSC or a base transceiver station BTS in a base station system) so that the SGSN can provide a packet service for mobile data terminals via several base stations, i.e. cells. An intermediate mobile communications network provides radio access and packet-switched data transmission between the SGSN and mobile data terminals. Different sub networks are in turn connected to an external data network, e.g. to a public switched data network PSPDN, via GPRS gateway support nodes GGSN. The GPRS service thus allows the provision of packet data transmission between mobile data terminals and external data networks when the GSM network functions as a radio access network RAN.

Third-generation mobile systems, such as Universal Mobile Communications system (UMTS) and Future Public Land Mobile Telecommunications system (FPLMTS), later renamed as IMT-2000 (International Mobile Telecommunication 2000), are being developed. In the UMTS architecture a UMTS terrestrial radio access network, UTRAN, consists of a set of radio access networks RAN (also called radio network subsystem RNS) connected to the core network (CN). Each RAN is responsible for the resources of its set of cells. For each connection between a mobile station MS and the UTRAN, one RAN is a serving RAN. A RAN consists of a radio network controller RNC and a multiplicity of base stations BS. One core network which will use the UMTS radio access network is the GPRS.

One of the main targets in the development of mobile communications networks is to provide an IP (Internet Protocol) service with a standard IP backbone which would use a combination of mobile network mobility management in the mobile networks and Mobile IP. The basic IP concept does not support the mobility of the user: the IP addresses are assigned to network interfaces depending on their physical location. In fact, the first field of an IP address (the NETID) is common to all interfaces that are linked to the same Internet subnet. This scheme prevents the user (the mobile host) from keeping its address while moving over different Internet subnets, i.e. while changing the physical interface.

In order to enhance mobility in the Internet, a Mobile IP protocol for IP version 4 has been introduced by the Internet Engineering Task Force (IETF) in the standard RFC2002. A mobile IP enables the routing of IP datagrams to mobile hosts, independently of the point of attachment in the sub network. The mobile IP protocol introduces the following new functional or architectural entities.

'A Mobile Node (MN)' (also called Mobile Host MH) refers to a host that changes its point of attachment from one network or sub network to another. A mobile node may change its location without changing its IP address; it may continue to communicate with other Internet nodes at any location using its (constant) IP address. 'A Mobile Station (MS)' is a mobile node having a radio interface to the network. A 'Tunnel' is the path followed by a datagram when it is encapsulated. The model is that, while it is encapsulated, a datagram is routed to a known decapsulation agent which decapsulates the datagram and then correctly delivers it to its ultimate destination. Each mobile node is connected to a home agent over a unique tunnel, identified by a tunnel identifier which is unique to a given Foreign Agent/Home Agent pair.

'A Home Network' is the IP network to which a user logically belongs. Physically, it can be e.g. a local area network (LAN) connected via a router to the Internet. 'A Home Address' is an address that is assigned to a mobile node for an extended period of time. It may remain unchanged regardless of where the MN is attached to the Internet. Alternatively, it could be assigned from a pool of addresses.

'A Mobility Agent' is either a home agent or a foreign agent. 'A Home Agent (HA)' is a routing entity on a mobile node's home network, which tunnels packets for delivery to the mobile node when it is away from home, and maintains current location information for the mobile node. It tunnels datagrams for delivery to, and, optionally, detunnels datagrams from, a mobile node when the mobile node is away from home. 'A Foreign Agent (FA)' refers to a routing entity in a mobile node's visited network which provides routing services to the mobile node while registered, thus allowing a mobile node to utilize its home network address. The foreign agent detunnels and delivers to the mobile node packets that were tunneled by the mobile node's home agent. For datagrams sent by a mobile node, the foreign agent may serve as a default router for registered mobile nodes.

RFC2002 defines 'Care-of Address (COA)' as the termination point of a tunnel toward a mobile node for datagrams forwarded to the mobile node while it is away from home. The protocol can use two different types of a care-of address: 'a foreign agent care-of address' is an address announced by a foreign agent with which the mobile node is registered, and 'a co-located care-of address' is an externally obtained local address which the mobile node has acquired in the network. An MN may have several COAs at the same time. An MN's COA is registered with its HA. The list of COAs is updated when the mobile node receives advertisements from foreign agents. If an advertisement expires, its entry or entries should be deleted from the list. One foreign agent can provide more than one COA in its advertisements. 'Mobility Binding' is the association of a home address with a care-of address, along with the remaining lifetime of that association. An MN registers its COA with its HA by sending a Registration Request. The HA replies with a Registration Reply and retains a binding for the MN.

A single generic mobility handling mechanism that allows roaming between all types of access networks would allow the user to conveniently move between fixed and mobile networks, between public and private networks as well as between PLMN's with different access technologies. Therefore, mechanisms supporting the Mobile IP functionality are also being developed in mobile communication systems, such as UMTS and GPRS.

The aim is to implement the Mobile IP as an overlay of the UMTS/GPRS network while maintaining backwards compatibility with present systems, assuming minimal modifications in the GPRS standards and on networks whose operators do not want to support MIP. FIG. 1 illustrates the minimum configuration for a GPRS operator who wishes to offer the mobile IP service. The current GPRS structure is kept and handles mobility within the PLMN, while MIP allows a user to roam between other systems, such as LANs, and UMTS without loosing an ongoing session. In FIG. 1 the foreign agents FA are located at the GGSNs. All GGSNs may not have FAs. The SGSN and the GGSN may also be co-located. One FA in a PLMN is sufficient for offering the MIP service, but for capacity and efficiency reasons, more than one may be desired. This means that the MS must request a PDP context to be set up with a GGSN that offers FA functionality. While setting up the PDP context, the MS is informed about network parameters of the FA, e.g. care-of address.

The MS may have the same care-of address COA during a session, i.e. as long as a PDP context is activated. A very mobile MS might perform several inter-SGSN HOs during a long session, which may cause an inefficient routing. As an initial improvement, a streamlining procedure with a temporary anchoring point in the GGSN could be introduced: If the MN is not transferring data or is possibly even in the active state while moving from one SGSN to another, a new PDP context can be setup between the new SGSN and its associated GGSN at the handover. The MN will get a new care-of address. If the MN is transferring data, e.g. being involved in a TCP session, the MN will move from the old SGSN to the new one while keeping the PDP Context in the old (anchor) GGSN for the duration of the data transfer. Once the data transfer is terminated, the PDP Context can be moved to the GGSN associated with the new SGSN. In other words, a new virtual connection to a new GGSN and an associated FA is established. A typical feature of the mobility agent in the mobile IP is that it periodically transmits agent advertisement messages to the mobile nodes in order to advertise its services. The mobile nodes use these advertisements to determine the current point of attachment to the Internet. Because of the new connection established by the access node to the new mobility agent, the agent advertisement messages sent by the new mobility agent can be received by the mobile node, and thereby the mobile node is able to detect the change of the attachment point (i.e. mobility agent) and to initiate a standard mobile IP registration.

More generally, in any Mobile IP agent registration, a PDP context is first opened. Then the agent registration is made over the open PDP context.

The problem is that because the mobile IP signaling is transferred on the user plane, the underlying access network nodes, such as the RNC and the SGSN, have no possibility to know whether the registration was successful or not. Thus, if the agent registration procedure fails, the underlying infrastructure is totally ignorant of the failure. This causes the unused PDP context to remain open and to use the resources unnecessarily. In the inter-GGSN (or inter-FA) handover described above, an additional problem arises. When the handover is performed, the SGSN controlling the handover has no possibility of knowing when to close the connection (PDP context) to the old GGSN/FA.

Similar problems may be encountered in any mobility management on a system level overlaying the access network. These various overlaying mobility managements are commonly referred to herein as a macro mobility management.

DISCLOSURE OF THE INVENTION

An object of the present invention is to overcome or alleviate the problems described above.

The object is achieved by a method and a system which are characterized by what is disclosed in the attached independent claims. Preferred embodiments of the invention are disclosed in the attached dependent claims.

In the present invention the gateway node having the associated (integrated) mobility entity is arranged to monitor the macro mobility registration during an initial registration or during a handover, and to trigger a deletion of any access network protocol context which is no longer necessary on the basis of the result of the registration. For example, the access network protocol context may be deleted, if the registration irrecoverably fails. If the registration was unsuccessful but a retry could be successful (the first failure was due to a load situation, for example), the PDP context may not deleted, but the registration is retried. A mobility entity may be any entity which provides a point of attachment on the macro mobility level, such as a mobility agent in mobile IP-type mobility management. In the preferred embodiment of the invention, the macro mobility management is mobile IP-type mobility management.

The present invention avoids the unnecessary use of access network resources after a failed macro mobility registration. It also has the advantage of reduced signaling in comparison with a case where a mobile node/station first deletes the mobile IP entities and then the PDP contexts some time after the failed registration.

BRIEF DESCRIPTION OF THE DRAWINGS

In the following, the invention will be described in greater detail by means of preferred embodiments with reference to the accompanying drawings, in which FIG. 2 is a signaling diagram illustrating the method according to the invention.

PREFERRED EMBODIMENTS OF THE INVENTION

The present invention can be applied to any communications requiring macro mobility management which overlays the mobility management of an access network. The invention is especially well suited for supporting mobile IP-type mobility management in an access network. The access network may be any access network, such as a radio access network. The invention is preferably used for providing a general packet radio service GPRS in the pan-European digital mobile communications system GSM (Global System for Mobile Communication) or in corresponding mobile communications systems, such as DCS1800 and PCS (Personal Communication System), or in third generation (3G) mobile systems, such as UMTS, implementing a GPRS-type packet radio. In the following, the preferred embodiments of the invention will be described by means of a GPRS packet radio network formed by the GPRS service and the 3G or GSM system without limiting the invention to this particular access system.

Figure 1:
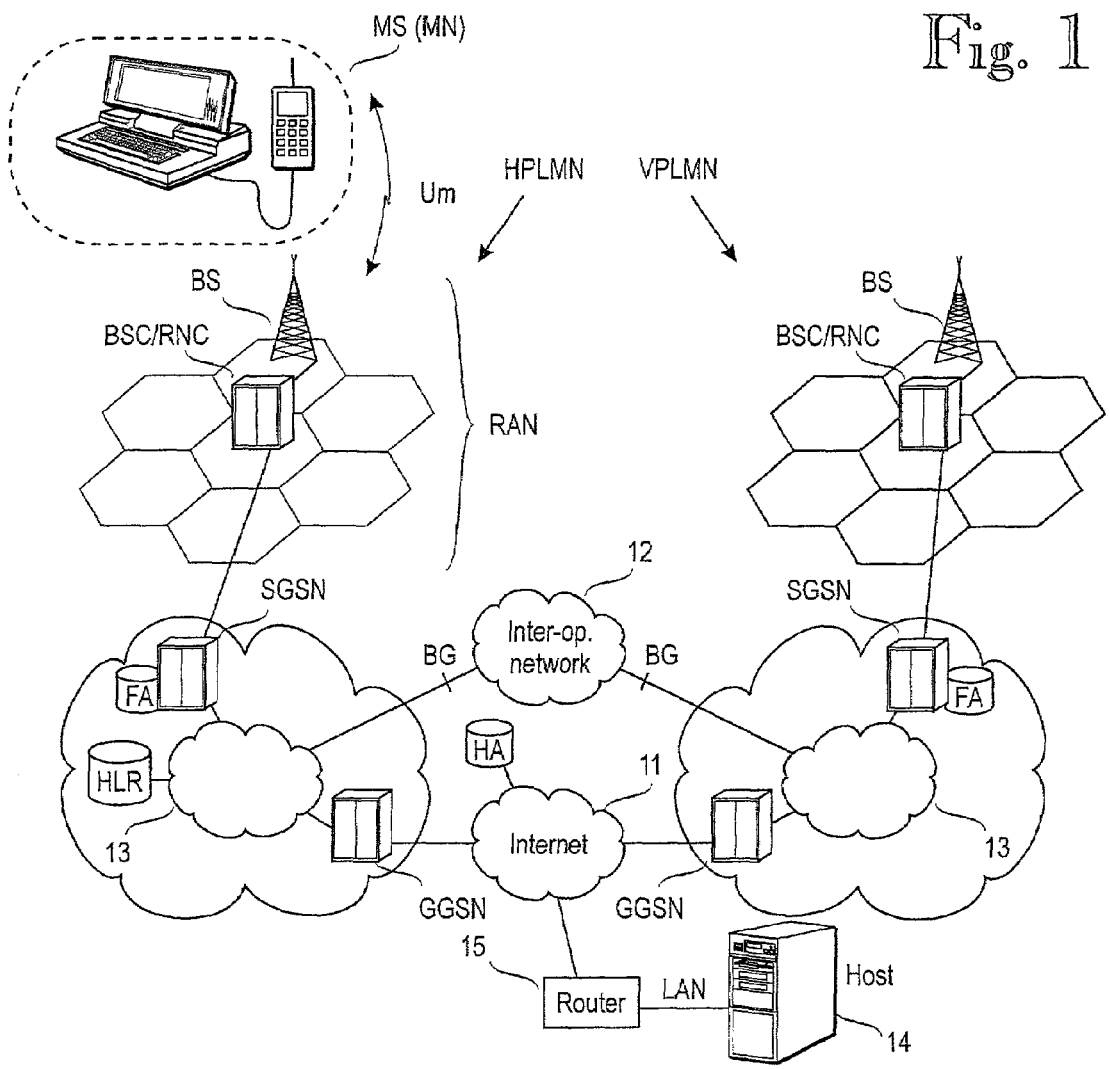
FIG. 1 illustrates a GPRS network architecture.

A GPRS architecture utilizing a 3G radio access (such as UMTS) or a 2G radio access (such as GSM) is illustrated in FIG. 1. The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS MS, and keep a record of the location of the MSs inside its service area. The subscription information is stored in a GPRS register (HLR) where the mapping between a mobile's identity (such as MS-ISDN or IMSI) and the PSPDN address is stored. The GPRS register acts as a database from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP network (Internet) or an X.25 network, and service centres. Fixed hosts 14 can be connected to the data network 11 e.g. by means of a local area network LAN and a router 15. A border gateway BG provides access to an inter-operator GPRS backbone network 12. The GGSN may also be connected directly to a private corporate network or a host. The GGSN includes GPRS subscribers' PDP addresses and routing information, i.e. SGSN addresses. Routing information is used for tunneling protocol data units PDU from the data network 11 to the current switching point of the MS, i.e. to the serving SGSN. The functionalities of the SGSN and GGSN can be connected to the same physical node (SGSN+GGSN).

The home location register HLR of the GSM network contains GPRS subscriber data and routing information and it maps the subscriber's IMSI into one or more pairs of the PDP type and PDP address. The HLR also maps each PDP type and PDP address pair into a GGSN node. The SGSN has a Gr interface to the HLR (a direct signaling connection or via an internal backbone network 13). The HLR of a roaming MS and its serving SGSN may be in different mobile communication networks.

The intra-operator backbone network 13 which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

Network access is the means by which a user is connected to a telecommunications network in order to use the services and/or facilities of that network. An access protocol is a defined set of procedures that enables the user to employ the services and/or facilities of the network. The SGSN, which is at the same hierarchical level as the mobile switching centre MSC, keeps track of the individual MS's location and performs security functions and access control. The GPRS security functionality is equivalent to the existing GSM security. The SGSN performs authentication and cipher setting procedures based on the same algorithms, keys, and criteria as in the existing GSM. The GPRS uses a ciphering algorithm optimized for packet data transmission.

In order to access the GPRS services, an MS shall first make its presence known to the network by performing a GPRS attach. This operation establishes a logical link between the MS and the SGSN, and makes the MS available for SMS over the GPRS, paging via the SGSN, and notification of incoming GPRS data. More particularly, when the MS attaches to the GPRS network, i.e. in a GPRS attach procedure, the SGSN creates a mobility management context (MM context), and a logical link LLC (Logical Link Control) is established between the MS and the SGSN on a protocol layer. MM contexts are stored in the SGSN and MS. The MM context of the SGSN may contain subscriber data, such as the subscriber's IMSI, TLLI and location and routing information.

In order to send and receive GPRS data, the MS shall activate the packet data address that it wants to use, by requesting a PDP activation procedure. This operation makes the MS known in the corresponding GGSN, and interworking with external data networks can commence. More particularly, one or more PDP context is created in the MS and the GGSN and the SGSN, and stored in the serving SGSN with the MM context. The PDP context defines different data transmission parameters, such as the PDP type (e.g. X.25 or IP), PDP address (e.g. IP address), quality of service QoS and NSAPI (Network Service Access Point Identifier). The MS activates the PDU context with a specific message, Activate PDP Context Request, in which it gives information on the TLLI, PDP type, PDP address, required QoS and NSAPI, and optionally the access point name APN. The SGSN sends a create PDP context message to the GGSN which creates the PDP context and sends it to the SGSN. The SGSN sends the PDP context to the MS in an Activate PDP Context Response message, and a virtual connection or link between the MS and the GGSN is established. As a result, the SGSN forwards all the data packets from the MS to the GGSN, and the GGSN forwards the SGSN all data packets received from the external network and addressed to the MS. The PDP context is stored in the MS, the SGSN and the GGSN. When the MS roams to the area of a new SGSN, the new SGSN requests the MM and PDP contexts from the old SGSN.

FIG. 1 illustrates the implementation of a mobile IP in the GPRS/3G environment.

The MS can be a laptop computer PC connected to a packet radio-enabled cellular telephone. Alternatively, the MS can be an integrated combination of a small computer and a packet radio telephone, similar in appearance to the Nokia Communicator 9000 series. Yet further embodiments of the MS are various pagers, remote-control, surveillance and/or data-acquisition devices, etc. The user of a mobile station MS subscribes to a special Mobile IP service. The subscription information is stored in the Home Location Register HLR together with the user's home IP address.

In FIG. 1 the foreign agents FA are located at (integrated into) the GGSNs. An alternative is that the SGSN and the GGSN are co-located, and the FAs are located at the SGSN+GGSNs. The present invention is applicable in both cases. It should be noted that there may be more than one SGSN and GGSN in one network. All GGSNs may not have FAs. Each FA has an IP address on the Internet and in the operator's own private GPRS/3G backbone network. More precisely, the FA's IP address is such that IP packets destined to that address are routed on the Internet to the GGSN associated with the FA. When the MN leaves its home subnet and registers to a new FA, it can no longer be reached on the basis of its home IP address alone, but must be assigned an address belonging to the visited network, called the care-of address (COA). The care-of address positively identifies the instantaneous location of the mobile terminal and may be: 1) the IP address of the FA belonging to the visited network, or 2) an IP address acquired directly by the mobile terminal through an autoconfiguration mechanism from the local IP address space, in which case the term co-located care-of address is used. When registering to a new FA and obtaining a COA, the MN which then registers with a home agent HA, in its home network, and informs the latter of its COA. In FIG. 1 a home agent HA is located in a data network 11 which is the home network of the mobile node MN associated with the mobile station MS. A second host 14 wishing to communicate with the MN need not be aware that the MN has moved: it simply sends IP packets addressed to the MN's home IP address. These packets are routed via normal IP routing to the MN's home network, where they are intercepted by the HA. The HA encapsulates each packet of this kind in another IP packet which contains the MN's COA and these packets are then delivered to the FA (a process called tunneling). The FA forwards the IP packet to the GGSN. The GGSN forwards the IP packet (which may be encapsulated for transmission over the GPRS backbone) to the serving SGSN which further forwards the IP packet to the MS/MN. Packets from the MN to another host 14 need not necessarily be tunneled: the MN may simply send them to the GGSN which directly forwards the packets to the second host 14 without interception by the FA or the HA.

An example of inter-GGSN handover will be now described with reference to FIG. 2.

Reference is now made to FIG. 1. The home network of the mobile station MS is the GPRS/3G network 1. The user of the mobile station MS subscribes to a special mobile IP service, and an IP application in the MS or in a separate data terminal is a mobile node MN in a mobile IP communication. It is assumed that the MS/MN is attached to the home network 1 and the radio access network RAN1 (PS1 and PSC/RNC1). A serving support node in the home network is SGSN1. MM and PDP contexts have been created for the mobile IP service as described above, and a virtual connection is provided between the MS/MN and SGSN1 as well as between the SGSN1 and a gateway node GGSN1 which has an associated foreign agent FA1. Thus, the IP packets addressed to the MN can be forwarded to the MN over the home network 1 and RAN1. The COA of the MN has been registered to the home agent HA in the home network 11 of the MN, so that mobile IP tunneling is provided from the HA to the GGSN/FA1.

Let us now assume that the MS/MN moves to the service area of another GPRS/3G network 2 which is served by a support node SGSN2. When the MS/MN arrives at a new RAN2, the MS part listens to radio broadcast messages, which contain information about radio parameters, network and cell identity, etc. as well as information about available core network, service providers, service capabilities, etc. On the basis of the broadcast, the MS determines that the network and/or the routing area has changed. Upon detecting a change of routing area, the MS/MN sends a routing area update request to the new SGSN, namely SGSN2, as shown in FIG. 2. The new SGSN2 sends an SGSN context request message to the old SGSN1 (in step 2) to get the MN and PDP contexts for the MS/MN. The old SGSN1 replies with an SGSN context response message which contains the MN and PDP contexts (step 3). According to the preferred embodiment of the invention, the information transferred from the old access node to the access node may be provided with an information field which indicates the different types of the PDP contexts, or at least the Mobile IP-related PDP contexts. This allows the SGSN to distinguish the Mobile IP-dedicated PDP contexts from other active PDP contexts of the mobile station which should not be involved in the change of the mobility agent. There are various possible ways to implement the PDP context type information. For example, a PDP Context Information Element which is carried in the SGSN Context Response message in the GPRS (and in the forward SNRC relocation message in UMTS) may be provided with a field indicating the type of service used over the PDP context. The type field may contain an Access Point Name which has a value indicating a Mobile IP PDP context. Spare bits in the PDP Context Information Element may be used for the new field, or alternatively the new field may be an extension of the current PDP Context Information Element format. It should be noted, however, that the exact implementation is not relevant to the invention. It is only relevant, in this specific embodiment that the information received from the old SGSN enables the new SGSN to determine which PDP context(s) is (are) dedicated to the Mobile IP.

Figure 3:
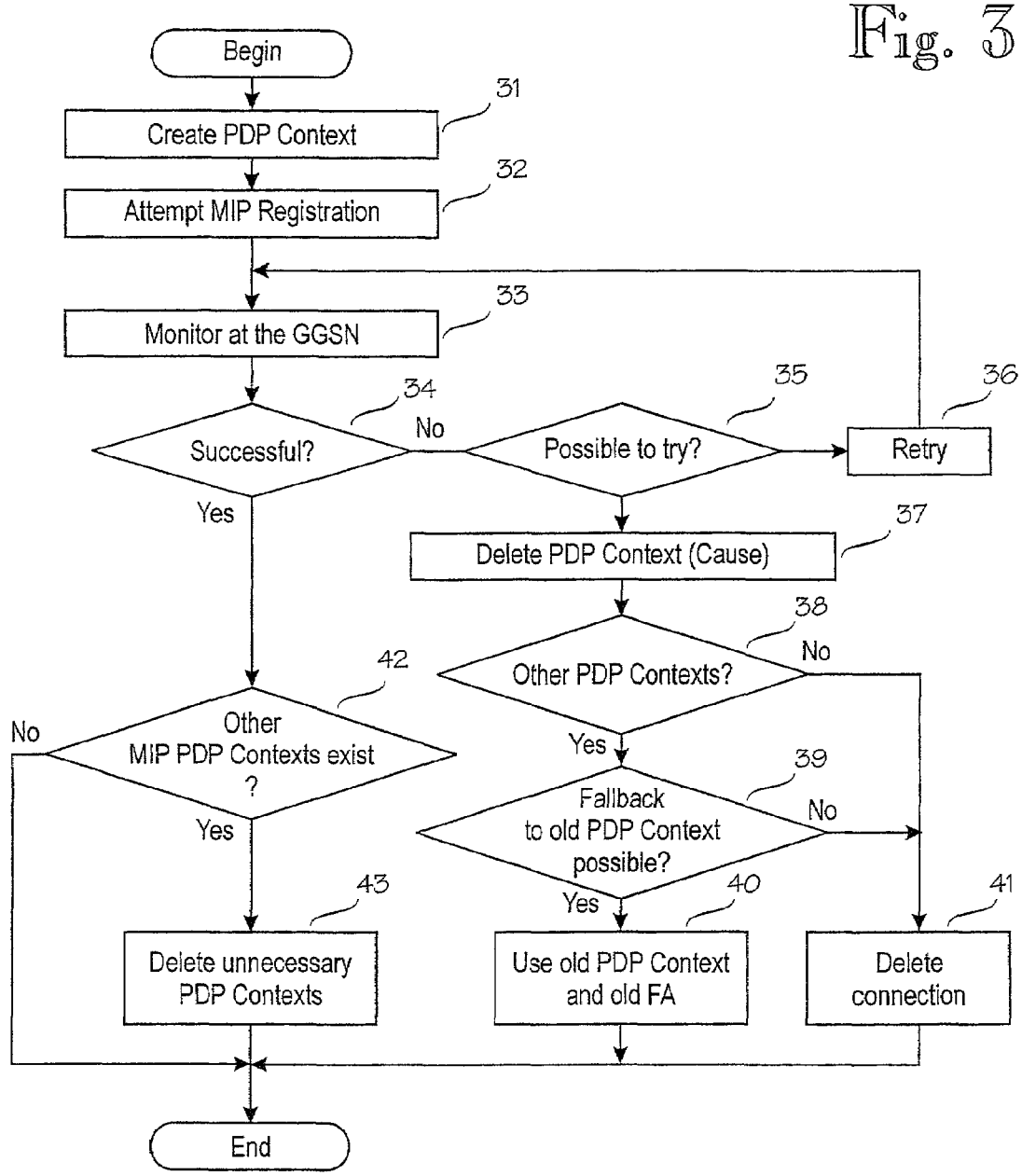
FIG. 3 is a flow diagram illustrating the inventive functionality at the GGSN and the SGSN.

In step 4, the new SGSN2 may, in certain situations, execute authentication/security functions which may involve an interrogation of the HLR of the MS/MN. If the user has at least one activated PDP context, the new SGSN2 sends a SGSN context acknowledge message to the old SGSN1. The old SGSN1 may now start forwarding of buffered data packets belonging to the activated PDP context, if any, to the new SGSN2. The new SGSN2 now detects that the new foreign agent FA2 should preferably be used instead of FA1, in step 6. The SGSN2 deletes the PDP context from the old GGSN/FA1 by sending a delete PDP context request to the old GGSN/FA1. As a result, any active PDP context in the GGSN/FA1 is deactivated, and the GGSN/FA1 acknowledges by sending a delete PDP context response to the new SGSN2 (step 8 in FIG. 2). Referring to FIG. 3, the process proceeds to step 34 wherein the new SGSN2 creates a PDP context in the GGSN/FA2 by sending a create PDP context request to the new GGSN/FA2 (step 9 in FIG. 2). The GGSN/FA2 creates the PDP context for the MS/MN and returns a create PDP context response to the new SGSN2 (step 10 in FIG. 2). The new SGSN2 establishes MN and PDP context for the MS/MN, and replies to the MS/MN with a routing area update accept message (step 11). The MS/MN acknowledges with a routing area update complete message (step 12). A virtual connection has thus been established between the MS/MN and the GGSN/FA2.

All the previous procedures have been executed on the GPRS/3G layer only. Due to the newly established connection to the GGSN/FA2, the MN is able to hear the agent advertisement messages broadcasted by the new FA2 in accordance with the mobile IP protocol. Upon receiving an agent advertisement from the new FA2, the MN is able to detect a change in the point of attachment, i.e. a change of the FA, in accordance with the MIP standard. The agent advertisement message may also include the care-of address COA, or the MN may acquire the COA in accordance with the MIP standard. Then the mobile node MN registers its COA with its home agent HA in accordance with the MIP standard (step 14 in FIG. 2). Depending on its method of attachment, the MN will register either directly to its HA, or through the new FA which forwards the registration to the HA. Thereafter, mobile IP tunneling between the HA and the old GGSN/FA1 is released and new mobile IP tunneling is established between the HA and the new GGSN/FA2, in accordance with the mobile procedures.

As the mobile IP signaling is transferred on the user plane, the underlying access network nodes, such as the RNC and the SGSN, have no possibility of knowing whether the registration was successful or not.

According to the present invention, the GGSN2 monitors (step 15) whether the Mobile IP registration is successful or fails. This is possible since the FA2 is located at the GGSN2, and, therefore, the GGSN2 also knows the status of the FA2. When the GGSN2 detects that the registration was successful, no further measures are required except that the old connection between the GGSN1 and SGSN2 must be deleted. However, if the GGSN2 detects that the registration fails, the GGSN2 can determine the severity of the failure and decide whether to allow the mobile node MN to try to register again or to terminate the registration procedure and delete the PDP context. If the GGSN decides that the registration can be tried again, the PDP context is maintained. If the GGSN2 decides that the failure is so severe that no repetition of the registration procedure can be allowed in order to complete the registration, the GGSN2 deletes the associated PDP context at the GGSN2 (step 16) and sends to the SGSN2 a Delete PDP message (step 17). The message may also include a cause value which indicates why the deletion was made, i.e. failure in the MIP registration. The SGSN2 receives the message and deletes the PDP context to the GGSN2 (step 18). The SGSN2 may also use the cause value in the message in deciding (step 19) whether the other PDP context open to the old GGSN1 (assuming steps 7 and 8 have not yet been performed) should be maintained or deleted, or should the Air PDP context to the MS/MN be also deleted. If the PDP context to the old GGSN1 is maintained, the MS/MN is able to reregister to the FA1 and/or to continue communication. To enable this alternative, the deletion of the old PDP context, i.e. steps 7 and 8, is delayed long enough that a possible Delete PDP message from the GGSN2 due to a failed registration will be received before the deletion. In step 20, the SGSN2 sends Delete PDP Request messages to the MS and GGSN1, upon deciding that the PDP contexts are to be deleted both from the MS and GGSN1.

The principles described above are applicable to any situation in which an MIP registration is attempted. In the GPRS attach procedure, the MS requests a PDP activation for a mobile IP by an Activate PDP Context Request message. The SGSN2 sends a Create PDP Context message to the GGSN2 which creates the PDP context and sends it to the SGSN2. The SGSN2 sends the PDP context to the MS in a Activate PDP Context Response message. Thus, a PDP context is created in the MS and the GGSN2 and the SGSN2 and a virtual connection or link between the MS and the GGSN2/FA2 is established. As a result, an MIP registration can now be performed over the virtual connection. As described above with respect to FIG. 2, the GGSN2 monitors the Mobile IP registration procedure and deletes the PDP context and releases the virtual connection, if the registration fails.

FIG. 3 is a flow diagram illustrating the inventive functionality at the GGSN and the SGSN. First, in step 31 a PDP context and a new connection is created. Then a MIP registration is attempted over a new connection (step 32). The GGSN monitors the registration (step 33) and determines whether the registration was successful or not (step 34). If the registration was successful, the GGSN determines whether there are other MIP-PDP contexts for the mobile node MN (step 42). If not, the procedure is ended. If there is another MIP-PDP context which is unnecessary for the new registration, the unnecessary PDP context is deleted (step 43) and the procedure is ended.

If it is determined, however, in step 34 that the registration failed, it is then determined whether it is possible to retry the registration (step 35). If yes, the registration is retried (step 36) and the procedure returns to step 33. If retry is not possible, the PDP context is deleted at the GGSN and a deleted PDP context message with a cause value is sent to the SGSN (step 37). The SGSN determines whether there are other PDP contexts for the same MN (step 38). If not, the connection between the MN and the old GGSN/FA is deleted (step 41). If any other PDP contexts exist in step 38, it is checked whether a fallback to this old PDP context is possible (step 39). If not, the procedure proceeds to step 41. If a fallback is possible in step 39, the old PDP context to the old FA and the old FA is used (step 40).

Figure 4:
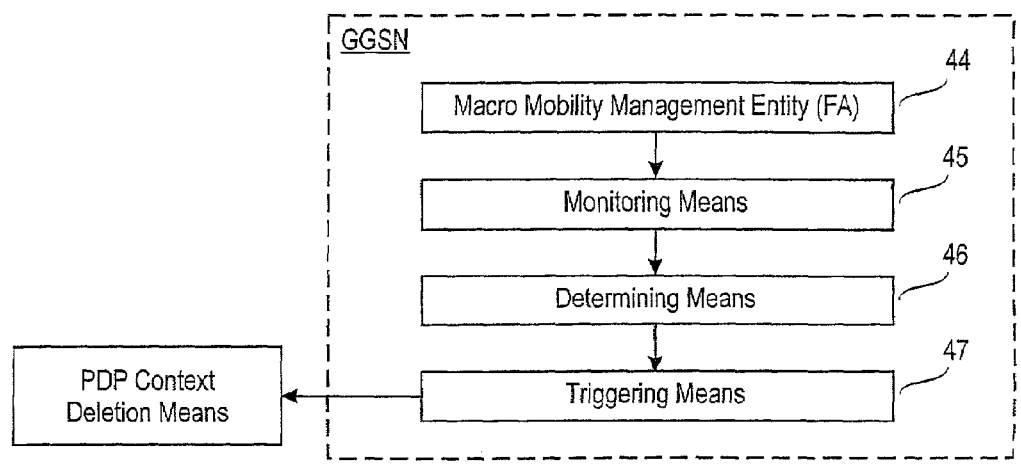
FIG. 4 is a block diagram illustrating the functional blocks of the GGSN involved in the present invention.

FIG. 4 is a block diagram illustrating the functional blocks of the GGSN involved in the present invention. Firstly, a macro mobility management entity 44, such as the foreign agent FA, is integrated into the GGSN. Further, monitoring means 45 are provided for monitoring the macro mobility (MIP) registration. Determining means 46 are provided for determining on the basis of the result of the mitered registration whether there is at least one unnecessary PDP context. Triggering means 47 are responsive to the determining means 46 so as to trigger a deletion of any determined unnecessary PDP context. PDP context deletion means stand for any entity or functionality in the system which is required for deleting a PDP context.

The description only illustrates preferred embodiments of the invention. The invention is not, however, limited to these examples, but it may vary within the scope and spirit of the appended claims.

The invention claimed is:

1. A method of managing access network protocol context in an access system comprising a plurality of mobile nodes, access nodes serving said mobile nodes, a first gateway node for interfacing a first part of the access system with external networks, and a first mobility entity which is associated with said first gateway node and arranged to provide macro mobility management services to the mobile nodes while registered to a respective part of the access system, said method comprising:

opening at least one access network protocol context at a first access node to activate a packet data address and make the packet data address known to the first gateway node in order to establish a connection between one of said plurality of mobile nodes and said first gateway node, initiating a macro mobility registration over said access network connection between the mobile node and the first mobility entity, monitoring at the first gateway node the macro mobility registration, determining on the basis of the result of the registration that at least one access network protocol context is no longer necessary, including determining at the first gateway node, in response to detecting a failure in said macro mobility registration, whether it is possible to retry the macro mobility registration or whether the registration has irrecoverably failed, triggering a deletion of the unnecessary access network protocol context.

2. A method as claimed in claim 1, comprising the gateway node sending a context deletion message to the first access node, when the macro mobility registration irrecoverably fails.

3. A method as claimed in claim 2, comprising deleting at the first access node the PDP context to the first gateway node in response to receiving said context deletion message.

4. A method as claimed in claim 3, comprising deleting at the first access node the PDP context to the mobile node in response to receiving said deletion message.

5. A method as claimed in claim 1, wherein said registration is due to a handover from a second gateway node to said first gateway node, the method comprising further steps of deciding at the first access node, in response to receiving a context deletion message from the first gateway node, whether to maintain or recreate an old PDP context to an old gateway node, or to delete the PDP context to the old gateway node and/or to the mobile node.

6. A method as claimed in claim 5, wherein said decision is based on a cause value in said context deletion message, said cause value indicating a cause for sending the context deletion message.

7. A method as claimed in claim 1, wherein said macro mobility management is Internet Protocol-type, or IP-type mobility management.

8. A method as claimed in claim 1 in a radio access system, wherein said access network protocol context comprises a packet protocol context.

9. A method as claimed in claim 1, wherein said mobility entity associated with the gateway node is a foreign agent.

10. An access system, comprising a plurality of mobile nodes, access nodes, a first gateway node for interfacing said access system with external networks, a first mobility entity which is associated with said first gateway node and arranged to provide macro mobility management services to the mobile nodes while registered to a respective part of the access system, each mobile node being able to perform a macro mobility registration to the first mobility entity over a respective dedicated access network connection established by opening an access network protocol context at a first access node and the first gateway node, the first gateway node being arranged to monitor the macro mobility registration, to determine in response to detecting a failure in said macro mobility registration whether it is possible to retry the macro mobility registration or whether the registration has irrecoverably failed and to trigger a deletion of any access network protocol context which is no longer necessary on the basis of the result of the registration.

11. A system as claimed in claim 10, comprising the gateway node being arranged to send a context deletion message to the first access node, when the macro mobility registration irrecoverably fails.

12. A system as claimed in claim 11, comprising first access node being arranged to delete the PDP context to the first gateway node and/or the PDP context to the mobile node in response to receiving said deletion message.

13. A system as claimed in claim 10, comprising said registration being due to a handover from a second gateway node to said first gateway node, and said first access node being arranged to decide, in response to receiving a context deletion message from the first gateway node, whether to maintain or recreate an old PDP context to an old gateway node, or to delete the PDP context to the old gateway node and/or to the mobile node, based on a cause value in said context deletion message, said cause value indicating a cause for sending the context deletion message.

14. A system as claimed in claim 10, wherein said macro mobility management is Internet Protocol-type, or IP-type mobility management, and wherein said mobility entity associated with the gateway node is a foreign agent.

15. A system as claimed in claim 10 in a radio access system, wherein said access network protocol context comprises a packet protocol context.

16. An access system comprises a plurality of mobile nodes, access nodes and a first mobility entity which is associated with a first gateway node and arranged to provide macro mobility management services to the mobile nodes, each mobile node being able to perform a macro mobility registration to the first mobility entity over a respective dedicated access network connection established by opening an access network protocol context at a first access node and the first gateway node, said first gateway node for monitoring the macro mobility registration, to determine in response to detecting a failure in said macro mobility registration whether it is possible to retry the macro mobility registration or whether the registration has irrecoverably failed and to trigger a deletion of any access network protocol context which is no longer necessary on the basis of the result of the registration.

17. A gateway node as claimed in claim 16, comprising said gateway node being integrated into the same physical node with said access node.

18. An access system comprises a plurality of mobile nodes, access nodes and a first mobility entity which is associated with a first gateway node and arranged to provide macro mobility management services to the mobile nodes, each mobile node being able to perform a macro mobility registration to the first mobility entity over a respective dedicated access network connection established by opening an access network protocol context at a first access node and the first gateway node, said first gateway node being arranged to monitor the macro mobility registration and to send a context deletion message to the first access node to trigger a deletion of any access network protocol context which is no longer necessary, when the macro mobility registration irrecoverably fails.

* * * * *